United States Patent

[11] 3,563,612

| [72] | Inventors | Tosiaki Okamoto;<br>Sinji Kawai, Kariya-shi, Japan |
|---|---|---|
| [21] | Appl. No. | 821,253 |
| [22] | Filed | May 2, 1969 |
| [45] | Patented | Feb. 16, 1971 |
| [73] | Assignee | Aisin Seiki Company Limited<br>Aichi-ken, Japan |
| [32] | Priority | May 4, 1968 |
| [33] | | Japan |
| [31] | | 43/29975 |

[54] LOAD SENSING CONTROL MECHANISM FOR VEHICLE HYDRAULIC BRAKE SYSTEM
3 Claims, 5 Drawing Figs.

[52] U.S. Cl. .................................................... 303/22,
188/152, 303/6
[51] Int. Cl. ..................................................... B60t 8/18,
B60t 15/00
[50] Field of Search.......................................... 303/22,
22A, 6, 6C; 137/(O'DEA); 188/195, 152, 152.11;
60/545

[56] References Cited
UNITED STATES PATENTS

| 2,987,346 | 6/1961 | Wrigley | 303/22(X) |
| 3,285,673 | 11/1966 | Dobrikin | 303/22 |
| 3,290,882 | 12/1966 | Oberthur | 303/22(X) |
| 3,302,981 | 2/1967 | MacDuff et al. | 303/22(X) |
| 3,442,557 | 5/1969 | Oberthur | 303/22 |

Primary Examiner—Milton Buchler
Assistant Examiner—John J. McLaughlin, Jr.
Attorney—Sughrue, Rothwell, Mion, Zinn & MacPeak ABSTRACT: A hydraulic pressure control mechanism of load sensitive type inserted in a hydraulic piping extending between a hydraulic master cylinder and wheel brake cylinders of a powered vehicle for control of the pressure prevailing in the latter cylinders. The control mechanism is resiliently bridged between a chassis frame and a wheel axle of the vehicle through the intermediary of a load-sensing spring, and having a ball joint inserted between a valve piston and a motion transmitting rod for the piston.

PATENTED FEB 16 1971  3,563,612
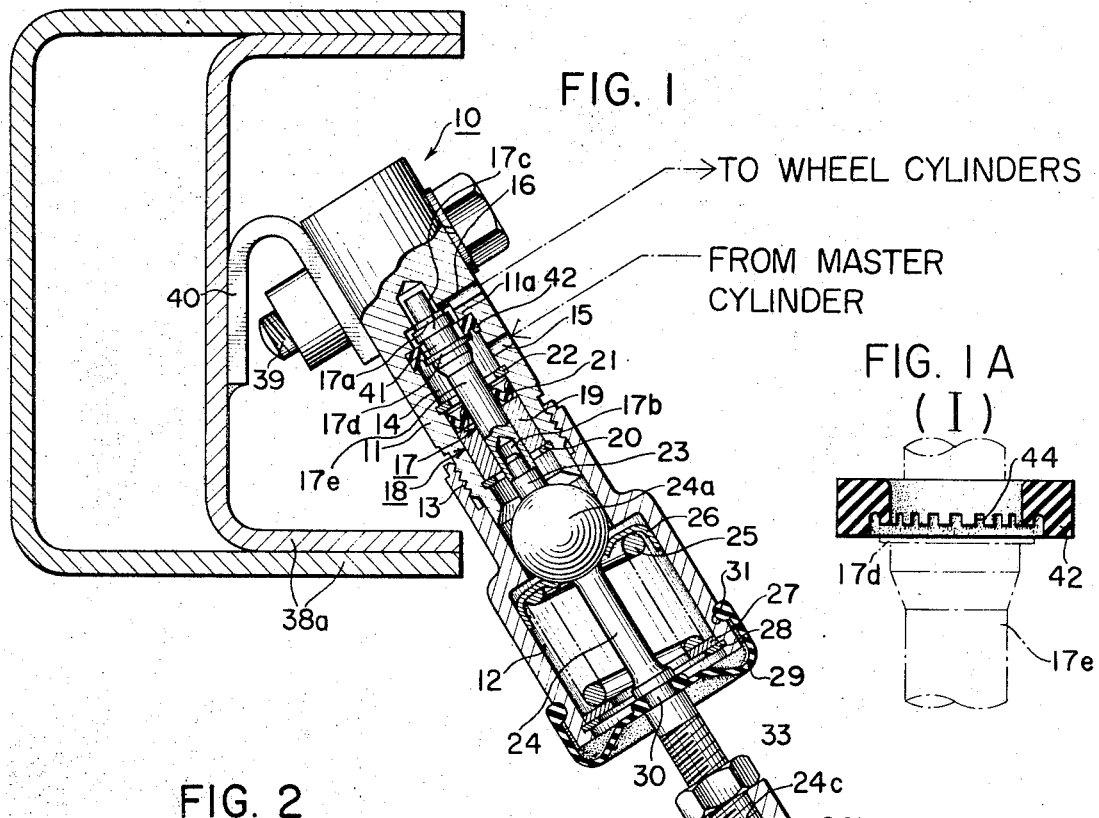
FIG. 1
FIG. 1A (I)
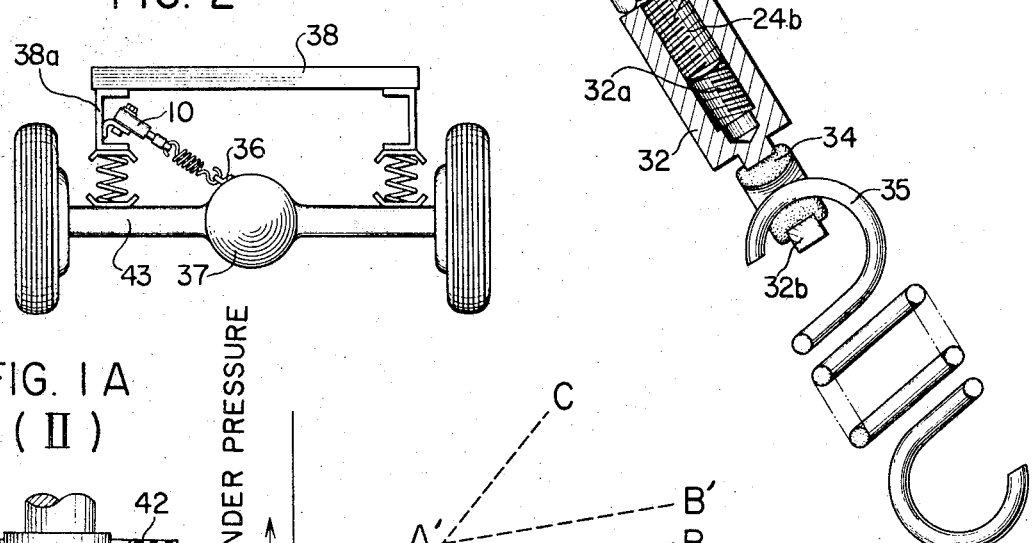
FIG. 2
FIG. 1A (II)
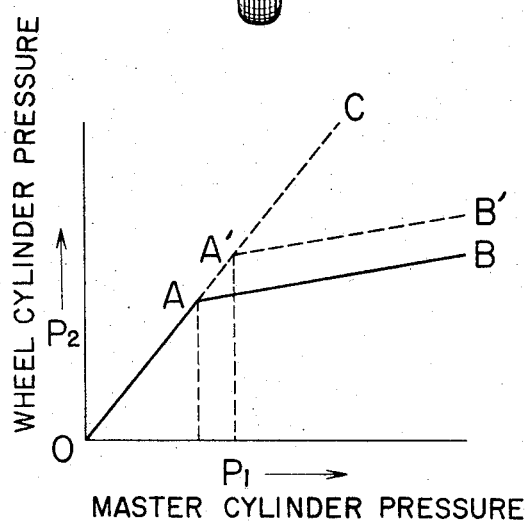
FIG. 3

LOAD SENSING CONTROL MECHANISM FOR VEHICLE HYDRAULIC BRAKE SYSTEM

This invention relates to improvements in and relating to load sensing control mechanisms for vehicle hydraulic brake systems, especially those for automotive use.

The above-mentioned control mechanism is known per se. This kind of mechanism is designed generally into a piston valve assembly inserted in a hydraulic piping provided between a hydraulic master cylinder and hydraulic brake wheel cylinders, said piston valve being arranged relatively movable in a cylinder depending upon the occasional distance between the automotive chassis frame and the wheel axle, especially the rear one. For this purpose, the piston-cylinder valve assembly is suspended between them by means of a suspension spring, mostly of the tension type.

The relative distance between the chassis frame and the wheel axle will naturally vary with occasional loading conditions of the chassis frame. The heavier the load, the shorter will become the relative distance, and vice versa. This relative displacement between chassis and axle is utilized for modifying the relative position of the valve piston to the housing cylinder, so as to alter the hydraulic brake pressure depending upon the loaded conditions. The mechanical connection between the valve-piston cylinder assembly and the axle is made through a tension or compression spring, as the case may be, while the corresponding connection between the chassis and the valve piston assembly is established through a mechanical linkage. Naturally, the above suspension system may be reversed. More specifically, the valve-piston cylinder assembly may be suspended from the chassis frame through a mechanical linkage, while the assembly is connected through a compression spring with the axle.

It has, however, been experienced that the relative motion between chassis and axle is performed practically in every direction and the relatively moving elements of the valve-piston assembly may encounter severe frictional resistance or even clogging or sticking, resulting in a disturbance of the desired control operation of the valve assembly.

Therefore, the main object of the invention is to provide a hydraulic pressure control valve assembly of the above kind which can operate in a highly smooth and accurate manner irrespective of various and severe relative movements of the chassis to the wheel axle of a powered vehicle.

A further object is to provide the control valve assembly of the above kind which is simple in its design and manufacture and accurately responsive to occasional variation of the loading conditions of the vehicle.

These and further objects, features and advantages of the invention will become more clear when read the following detailed description of the invention by reference to the accompanying drawings constituting part of the present specification and showing by way of example a preferred embodiment of the invention.

In the drawings:

FIG. 1 is substantially axial sectional view of a preferred embodiment of the load sensing control mechanism for vehicle hydraulic brake system.

FIG. 1A is a detailed partial view thereof with the valve piston cooperating with its valve seat member in two different operating positions at (I) and (II).

FIG. 2 is a schematic end view of a part of an automotive chassis frame and a rear wheel axle, the control assembly being shown as provided between the both.

FIG. 3 is a representative characteristic performance curve of the hydraulic pressure control valve assembly embodying the principles of the present invention.

Referring now to the drawings, a hydraulic pressure control unit 10 comprises two cylinder elements 11 and 12 rigidly, yet detachably connected with each other by means of screw connection means at 13, thereby defining a hydraulic working chamber 14 within the upper part of the combined cylinder. Cylinder element 11 is formed with ports 15 and 16, the former being hydraulically connected with a conventional master cylinder, not shown, and the latter with conventional hydraulic wheel cylinders, again not shown, through a proper hydraulic piping.

A hydraulic valve piston 17 is provided so as to slidably reciprocate within the working chamber 14, the latter being defined at its lower end by a sealing and guiding assembly 18 which comprises a bearing sleeve 19, a retainer spring 20 provided for the latter and detachably mounted on the inside wall surface of cylinder element 11, a cup-shaped sealing means 21 and a further retainer spring 22 mounted on the cylinder wall as shown. The uppermost shoulder 17a of piston 17 abuts normally against the upper cylinder end wall of cylinder element 11. The piston 17 is made from a light metal such as aluminum or its alloy for easy and lighter reciprocating movement thereof and formed at its lower end with an axial blind bore 17b in which the reduced part of a stepped pin 23, made preferably of case hardened steel, is received with press fit. The lower or enlarged part of pin 23 has a spherical bearing surface so as to establish a slidable and pivotable pressure contact with a ball end 24a of a rod 24. When necessary, however, the bearing surface of the pin 23 may be of plane. The ball end 24a is guided slidably by contact with the inside wall surface of the upper and reduced part of cylinder element 12. The rod 24 is urged resiliently upwards by means of a pressure spring 25 through an abutting ring 26 which has a cylindrical part so as to be slidable along the inside wall surface of the lower or enlarged part of cylinder element 12. The radially and inwardly extending part of the spring abutting ring 26 has a curved section so as to establish a permanent pressure contact with the ball 24a, irrespective of occasional angular relative position between the rod 24 and the cylinder assembly 11—12.

The lower or outer end of pressure spring 25 abuts against an abutting plate 27 which is held in position within the interior space of the enlarged part of cylinder element 12 by means of a retainer spring 28 detachably mounted on the inside wall surface of the cylinder 12 which is closed by a resilient sealing cap 29 attached, on the one hand, to a peripheral groove 30 on rod 24, and, on the other hand, to a further peripheral groove 31 formed on the outer wall of the enlarged part of cylinder element 12. By adopting the above-mentioned arrangement, urging force can always be transmitted in a highly smooth manner from pressure spring 25 to rod 24 which is mechanically connected at its lower end with an adjuster 32 so as to adjust the effective length of the rod as occasion may desire.

For this purpose, the rod end 24b is male threaded at 24c which is kept in screw engagement with the female screwthreads at 32a formed in the adjuster 32. Once adjusted relative position between rod end 24b and the adjuster 32 is kept unchanged by tightening a lock nut 33 which engages with the male threads 24c. The adjuster 32 is formed with an extension 32b in the form of a eye. One end of a tension spring 35 is kept in engagement with the eye 32b through a cushioning means 34, while the other or lower end of the tension spring is connected with a stop 36 mounted fixedly on the housing at 37 of a conventional automotive differential gearing, as easily seen from FIG. 2.

The upper end of the cylinder assembly is bolted pivotably at 39 to a mounting member 40 which is rigidly connected with a suitably selected part 38a of a conventional automotive chassis frame 38 only partially shown in FIG. 2.

A first collar 17c is formed on the valve piston 17 in close proximity of said abutting shoulder 17a which is normally separated a small distance from a resilient valve seat 42 as shown in FIGS. 1 and 1A at (I).

The valve piston 17 is formed with a second collar 17d at a small axial distance from first collar 17c; said second collar is normally kept in pressure contact with a resilient valve seat 42 for better positioning of the latter. This relative position corresponding to FIG. 1A at (II). As seen from FIG. 1A, the valve seat 42 is formed with a number of radial passages 44 on the lower and inner edge thereof kept in contact with the second collar 17d. Under these conditions, the hydraulic pressure liquid, preferrably oil, conveyed from the master cylinder through port 15 can flow through the valve gap formed between second collar 17d and valve seat member 42, thence through port 16 to wheel cylinders. The reduced diameter portion formed between said first collar and said second collar is denoted with numeral 41. In close proximity of said port 16, there is formed a shoulder or stop 11a on the cylinder wall 11, serving for positioning the seat member 42 which is a ring as shown and made from rubber or the like resilient material. Under occasionally shifted position of the hydraulic piston, the first collar 17c can effectively cooperate with said ring seat member 42 for preventing any fluid flow from port 15 to port 16 or more specifically from master cylinder to wheel cylinders. When the cross-sectional area of the hydraulic piston measured at the first collar 17c be expressed by $A_1$ and that measured at the reduced diameter stem portion 17e be denoted by $A_2$, it will be clear from the foregoing that $A_1$ is larger than $A_2$.

The operation of the control valve mechanism so far shown and described is as follows:

It will be clear from the foregoing that the rod 24 transmits a differential pressure between pressure spring 25 and tension spring 35 upon the stepped pin 23 through ball end 24a and the upper part of hydraulic piston 17 abuts normally against the cylinder end wall, as seen from FIG. 1A at (I).

When the driver applies under lighter loaded conditions of the vehicle the wheel brake by actuating a foot brake pedal not shown, the master cylinder pressure will gradually increase.

Then, it is assumed:

Tensile force of tension spring 35: $F_2$;
Compressive force of pressure spring 25: $F_1$ (substantially constant;
Cross-sectional area of hydraulic valve piston at 17e: $A_2$;
Cross-sectional area of hydraulic piston at first shoulder 17c to coact with ring seat 42: $A_1$;
Hydraulic master cylinder pressure: $P_1$;
Hydraulic wheel brake cylinder pressure: $P_2$;

Under these conditions the pressure $P_1$ will continue to increase under the condition: substantially $P_1 = P_2$ along the curve O-A shown in FIG. 3, until the valve seat 42 will have been brought into its closed position by virtue of the advancement of the valve piston with first collar 17c lastly brought into tight engagement with the valve seat member. With the valve thus closed upon attainment of the pressure $P_1$ at a predetermined value, the following relation will be established only at a certain time point directly after the valve closure:

$$P_2 A_1 = P_1 ( A_1 - A_2 ) + ( F_1 - F_2 ) - (1)$$

Therefore, the pressure $P_1$ or $P_2$ will thence increase its value along the curve A-B in FIG. 3. In practice, however, this course of pressure increase along A-B takes place in a pulsating manner.

Thus, when the valve 42 is closed, then the following condition will be established:

$$P_2 A_1 P_1 ( A_1 - A_2 ) + ( F_1 - F_2 ) - (2)$$

When the valve seat 42 is opened with increase of the pressure $P_1$, then the following relation will be about to establish:

$$P_2 = P_1$$

But, on account of the provision of differential piston area: $(A_1 - A_2)$, the pressure relationship will return next moment to that expressed by the equation (1). Then, the pressure $P_1$ will increase further again, and so on. Although the curve A-B is shown in a practically straight line, this course represents an infinitely repeated pulsating curve when precisely expressed.

When the vehicle is loaded heavier than before, the distance between the chassis frame 38 and the wheel axle 43 in FIG. 2 is shortened and the spring force $F_2$ will be reduced, while the spring force $F_1$ is substantially constant, thereby the differential spring force $F_1 - F_2$ being correspondingly increased. This means that the point A will shift to a certain higher point such as at A' along the line O-C, thus the initial master cylinder pressure $P_1$ necessary for closing the valve seat 42 will be increased. Thence, the relative pressure increase course between $P_2$ and $P_1$ will shift along a new curve A'-B' having an equal inclination angle to that of the former curve A-B. In this way, the hydraulic wheel cylinder pressure will correspondingly increase.

On the contrary, when the vehicle load is reduced, then the point A' will shift to point A, thence further to a lower point along the curve O-C. The wheel cylinder pressure will naturally be reduced correspondingly.

In the present hydraulic pressure control mechanism according to the invention, the basic working principle per se above described being already known, the provision of ball end 26 of motion transmitting rod 30 kept in pivotable pressure contact with the mating surface of the extension, formed into a stepped pin, of the valve piston 17 serves for smooth and effective transmission of valve control effort provided by the differential spring force between the members 25 and 35, irrespective of the various inclined position of the rod 24, to a practical range, to be caused by the practical relative movements of chassis 38 and wheel axle 43 when the vehicle is running, especially on an uneven road surface.

We claim:

1. In a hydraulic pressure control mechanism inserted in a hydraulic conduit extending between a hydraulic master cylinder and wheel brake cylinders of a powered vehicle for control of the pressure prevailing in the latter cylinders, said mechanism being resiliently bridged between a chassis frame and a wheel axle of said vehicle through the intermediary of a load-sensing spring and a transmission rod means and comprising a cylinder, a control piston slidable therein, valve means provided in the last-mentioned cylinder for on-off control of the passage of the hydraulic fluid flow from the master cylinder to the wheel cylinders, said piston having two different hydraulic pressure receiving areas for cooperating with said valve means, the improvements comprising a ball portion having a spherical acting surface integrally formed on the inner end of said rod means and a coating surface formed on an extension of said control piston, said both surfaces being kept always in pressure contact with each other; an abutting ring; a biasing spring provided in said cylinder for the control piston, said spring acting on said ball through the intermediary of the abutting ring consisting of a cylindrical part kept in slidable contact with said cylinder and having a ring part having a curved sectional configuration.

2. A hydraulic pressure control mechanism as in claim 1, wherein the improvements further comprise a screw adjuster provided between said rod and said load-sensing spring.

3. A hydraulic pressure control mechanism as in claim 1, wherein the improvements further comprise having the ball end of such a size that it operatively contacts the inside surface of the cylinder.